Patented Jan. 20, 1942

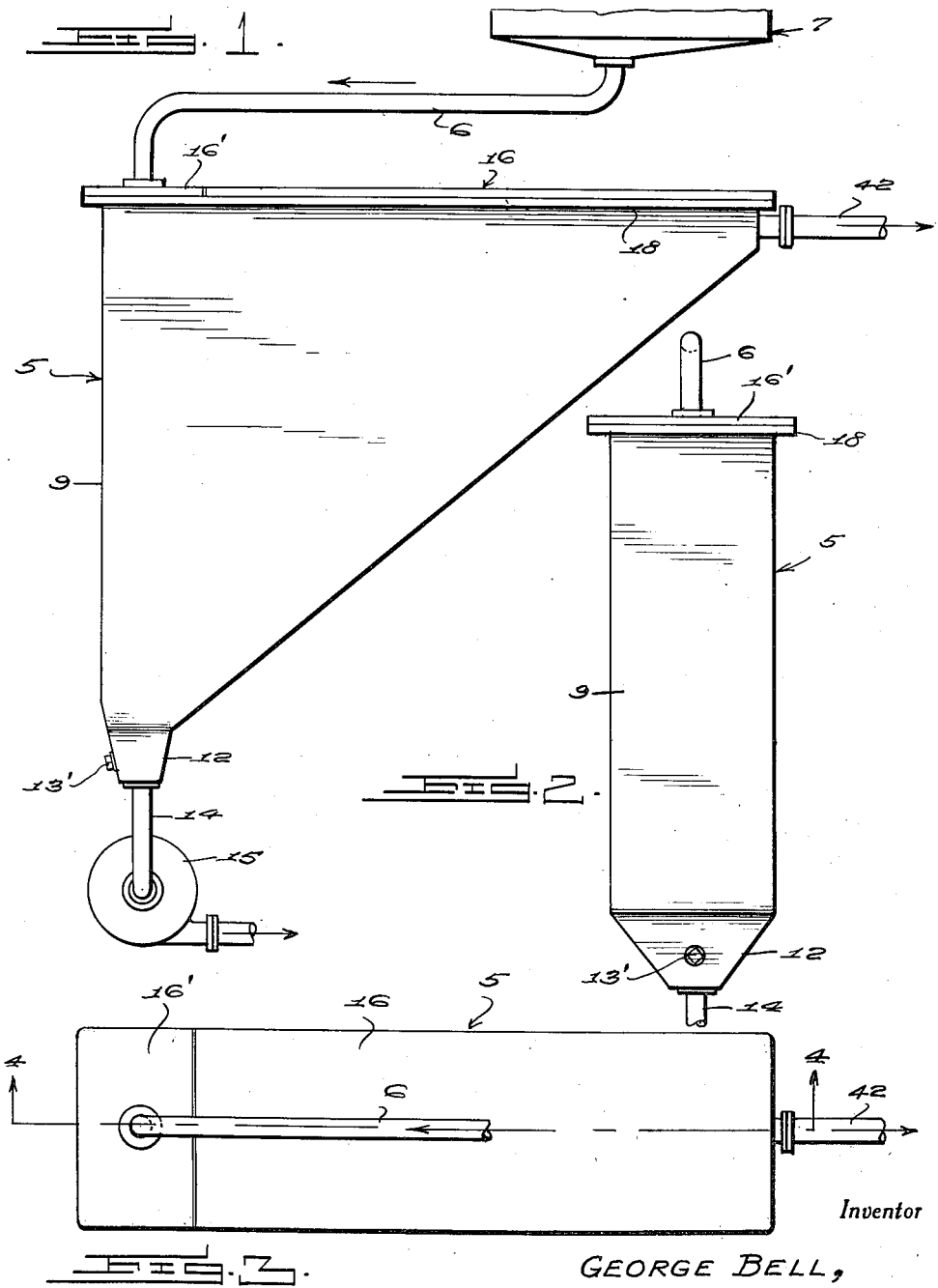

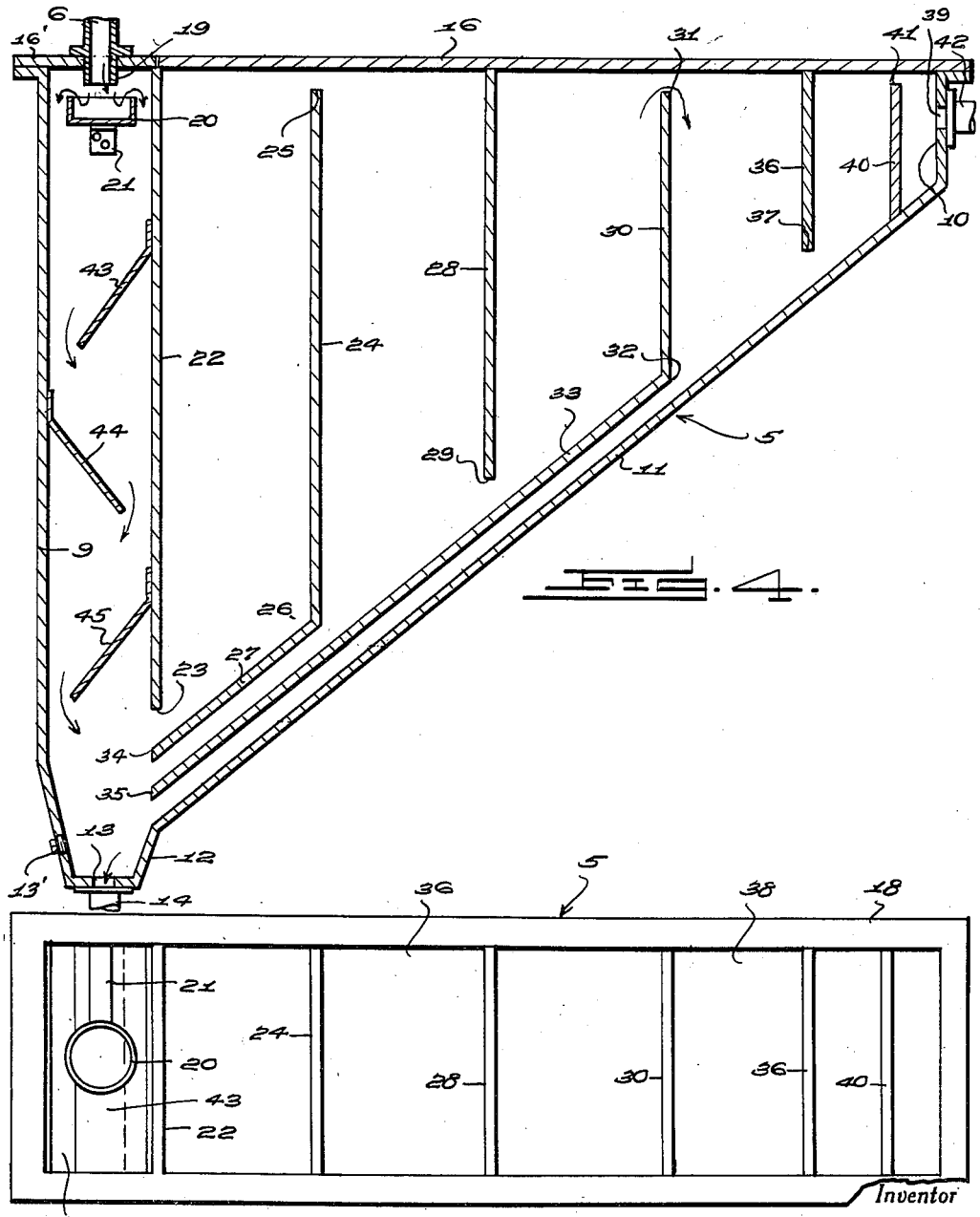

2,270,616

UNITED STATES PATENT OFFICE 2,270,616

RECLAIMING TANK

George Bell, Pottsville, Pa.

Application December 26, 1939, Serial No. 311,028

2 Claims. (Cl. 210—60)

My invention relates to an improved tank for reclaiming dried brewers' grains and the like, and an important object of my invention is to provide an arrangement of this character which successfully and efficiently catches the finer parts of materials which ordinarily pass on to the sewer and are lost, the said materials containing a large amount of fat and protein useful for the feeding of dairy stock, the arrangement enabling returning the caught material to the system in the drying press, so that the output has a higher protein and fat content, and the water consumption of the plant is substantially reduced.

Other important objects and advantages of my invention will be apparent from a reading of the following description taken in connection with the drawings, wherein for purposes of illustration I have shown a preferred embodiment of my invention.

In the drawings:

Figure 1 is a general side elevational view of the reclaiming tank showing the same in receiving relation to the outlet of the press, and in discharge relation to the pump which returns the fluid and the solid material therein to the press.

Figure 2 is an end elevational view.

Figure 3 is a top plan view.

Figure 4 is a longitudinal vertical sectional view taken through Figure 3 approximately on the line 4—4 and looking upwardly in the direction of the arrows.

Figure 5 is a top plan view of Figure 4 with the top or cover removed.

Referring in detail to the drawings, the numeral 5 generally designates the reclaiming tank of the present invention which may be fed by a pipe 6 leading from the discharge of the press which is generally designated 7 and which is located above the tank 5. The reclaiming tank consists of substantially parallel vertical side walls 8, a vertical end wall 9 between the left hand ends of the side walls 8—8, and a short similarly vertical wall 10 from the lower end of which declines the bottom 11 which extends to the trap 12 which is frustro-pyramidical in form and has in its bottom the discharge opening 13 which is connected with the pipe 14 which leads to the pump 15 by which the fluid and the entrained and caught material is returned to the wet tank, then through the press to the drier (not shown). A clean-out plug 13' is provided in one side of the trap 12 as shown.

The pipe 6 traverses a section 16' of the top or cover 16 which closes the upper end of the tank 5 and rests on flanges 18 extending laterally from the upper part of the tank and may be removed without disturbing the section 16'. The nipple 19 on the lower end of the pipe 6 empties directly into a cup 20 which is supported on a bracket 21 attached to one of the walls 8 of the tank, so that the force of the entering liquid is broken and the liquid forced to flow over the sides of the cup 20 and drop gravitationally in the tank between the end wall 9 and the first partition 22. The partition 22 is a wall extending between the side walls 8—8 from the upper end of the tank and terminating at its lower end as indicated by the numeral 23 in spaced relation to the bottom 11. Spaced to the right of the partition 22 is the second partition 24 which like all the other partitions extends between the side walls 8, 8 of the tank but is spaced as indicated by the numeral 25 at its upper end from the top 16 of the tank and has its lower end spaced as indicated by the numeral 26 from the bottom 11 and provided with a declining baffle 27 which terminates in spaced relation under the lower end 23 of the first partition 22. Similarly spaced to the right from the partition 24 is the third partition 28 which extends from the top 16 and has its lower end 29 in spaced relation to the bottom 11. The fourth partition 30 has its upper end 31 in spaced relation to the top 16 and its lower end 32 in spaced relation to the bottom 11 and is provided with a long baffle 33 which extends paralled to the adjacent portion of the bottom 11 and to the baffle 27 on the lower end of the second partition 24. The lower end 34 of the baffle 27 and the lower end 35 of the baffle 33 are bevelled and vertically aligned with the inner face of the partition 22, as shown in Figure 4.

The fifth partition 36 extends from the top 16 and has its lower end 37 in spaced relation to the bottom 11. A sixth partition or baffle 40 rises from the bottom 11 and has its upper end 41 spaced from the top 16, and on a level above the opening 39 in the wall 10 which communicates with the overflow pipe 42 and leads to the overflow or sewer.

In the present embodiment of the invention illustrating a tank about six feet in length and two feet wide, the baffles 27 and 33 are spaced from each other at about the same distance as the baffle 33 from the bottom 11. The lower end of the partition 22 is spaced above the partition 27 at a distance about one-quarter greater than the spacing of the baffles 27 and 33, and the same spacing applies to the distance between the lower end of the partition 28 and the baffle 33, and the lower end of the partition 36 and the bottom 11. Thus if the spacing of the baffles 27 and 33 and the spacing of the baffle 33 from the bottom is 2", the lower end of the partition 22 is about 2½", as is the spacing of the lower end of the partition 28 from the baffle 33. The lower end of the partition 36 is spaced about 2½" from the bottom 11. On the same scale, the upper end of the partition 41 is spaced at 1" from the top 16, the upper end of the partition 30 at 1½", and the upper end of the partition 24 at 1½" from the top 16.

In the chamber provided by the end wall 9 and the first partition 22 are staggered declining baffles 43, 44 and 45 reading downwardly, which are alternately attached to the partition 22 and the wall 9 as shown, below the cup 20.

As the water which is extracted from the grains by the press 7 is passed through the pipe 6 to the tank 5, this water passes downwardly in a zig-zag course due to the position and action of the baffles 43, 44 and 45, to the bottom of the tank where a large proportion of the solids drip into the tail pipe 14 leading to the pump 15, so that the discharge of the water is decelerated and accumulates in the second chamber between the partitions 22 and 24 until it rises to a sufficient level to flow over the top of the partition 24 as indicated by the arrow, where it falls into the third chamber between the partitions 24 and 28, wherein more solids drop into the false bottom of the tank and go on to the pump. The water accumulating in the third chamber passes around the lower end of the partition 28 into the fourth chamber, where it continues to rise until it moves over the top of the partition 30 and enters the fifth chamber where more solids go down to the bottom of the tank, so that the fluid reaching the sixth chamber and passing over the baffle 40 into the waste pipe 42 is practically free of solids and almost clear in color. The pump 15 acts to collect the solids retrieved or caught by the movement of the fluid through the tank and returns them to the wet tank which is located above the press and then passes the same through the press to the drier. As the solid material falls in the various chambers described, it moves gravitationally down along the baffle 33 and also along the bottom 11 as well as down along the baffle 27 so as to reach a final accumulation in the frustro-pyramidical portion 12.

It is shown by experiment and actual use that the use of the device of the invention increases the protein from 2 to 3 percent and the fat from 1 to 1½ percent, and that the output of the plant is increased from 2 to 3 percent, and the water consumption reduced from 25 to 30 per cent, in the operation of a plant, due to the reclaiming and recirculation of the solid material described.

Although I have shown and described herein a preferred embodiment of my invention, it is to be definitely understood that I do not desire to limit the application of my invention thereto, and any change or changes may be made in the structure and arrangement of the parts, within the scope of the subjoined claims.

Having described the invention, what is claimed as new is:

1. Apparatus for separating the solids from liquids in which said solids are entrained comprising a tank having end and side walls, respectively, a top, and an inclined bottom forming relatively deep and shallow ends in said tank, gravity feed means to introduce the liquid through the top of the tank directly above the deep end thereof to rise to different levels along said bottom and flow toward said shallow end whereby the solids are deposited on said bottom for gravitation to said lower end to thereby clarify said liquid, a clarified liquid discharge at the shallow end of said tank for the escape of such liquid rising in the tank to substantially an overflow level, a solids collecting means in said bottom at the deep end of the tank, and means to obstruct the flow of liquid toward said shallow end as it rises to higher levels to thereby effect further separation of the solids from the liquids comprising a battery of upright baffles spaced apart lengthwise of the tank for collecting solids thereon, said baffles being spaced above the bottom of the tank to permit the rise and flow of liquid therebetween, some of said baffles having extensions at their lower ends inclining to the solids collecting means whereby solids collected on said baffles and gravitating down the same are directed downwardly toward said collecting means, said extensions functioning also to collect solids thereon to gravitate down the same, and means to remove the solids from the solids collecting means.

2. A device according to claim 1 wherein other of said baffles are spaced above said extensions to permit solids gravitating down the extensions to pass below said other baffles.

GEORGE BELL.